United States Patent Office.

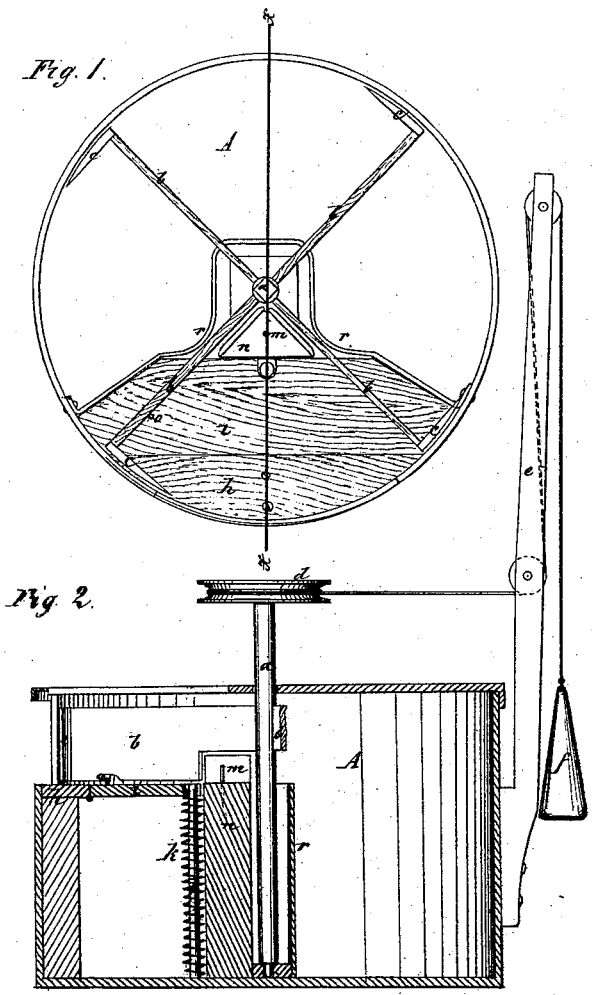

THOMAS E. MARABLE, OF PETERSBURG, VIRGINIA, ASSIGNOR TO HIMSELF AND S. A. PLUMMER, OF SAME PLACE.

Letters Patent No. 109,530, dated November 22, 1870.

IMPROVEMENT IN ANIMAL-TRAPS.

The Schedule referred to in these Letters Patent and making part of the same.

*To all whom it may concern:*

Be it known that I, THOMAS E. MARABLE, of Petersburg, in the county of Dinwiddie and State of Virginia, have invented a new and improved Animal-Trap; and I do hereby declare the following to be a full, clear, and exact description of the same, reference being had to the accompanying drawing making a part of this specification, in which—

Figure 1 is a plan view of the trap with the cover removed, and

Figure 2 is a sectional elevation.

This invention relates to an animal-trap in which is used a vertical standard provided with horizontal radial arms that are made to revolve by the application of any suitable power over and nearly in contact with a horizontal platform, which is furnished with a trap-door held up by a spring, and having a projecting pin which, when one of the aforesaid arms comes in contact with it, prevents the said arms from revolving, said trap-door, when trodden upon by an animal, yielding, and thus withdrawing the pin from in front of the radial arm, whereupon the latter suddenly sweeps the animal off the platform into a box beneath, thus relieving the trap-door of the animal's weight and allowing the spring to raise the trap-door into its former horizontal position, where its pin again arrests the revolving arms, thus both resetting the trap and closing the box in which the animal is imprisoned.

Referring to the drawing—

A is a box of cylindrical or other shape.

*a*, a shaft, stepped in the bottom of the box, and passing through an orifice in its top.

*b*, radial arms projecting horizontally from the shaft *a*, and provided each with an end piece, *e*, placed at right angles with the arms.

*d* is a grooved wheel placed horizontally on the shaft *b*; and wound around with a cord that passes over sheaves in the upright *e*, secured to one side of the box A, to the other end of which cord a weight, *f*, is attached, for the purpose of imparting a rotary motion to the shaft *a* and arms *b*.

Where there is space for the weight to hang low enough, the standard *e* may be dispensed with, and the sheave attached to the side of the box. Any other means may be used for making the shaft revolve.

A horizontal platform, *h*, is secured to one side of the interior of the box A, and to the inner edge of said platform a trap-door, *i*, is hinged; said trap-door is supported upon a spring, *k*, coiled around a stud, *l*, that projects upward from the bottom of the box A, and passes through a hole in the trap-door.

The spring *k* is made limber enough to yield to the weight of the animal for whose capture the trap is intended.

The bait is fastened upon a pin, *m*, projecting upward from the top of the block *n* that is secured to the bottom of the box, said pin being placed in such position that the animal cannot reach the bait without stepping on the trap-door. The latter is provided with a pin, *o*, against which, when the trap-door is horizontal, one of the arms, *b*, bears, and by which said arm is held stationary.

When the animal steps on the trap-door the spring *k* yields beneath his weight, and the trap-door falls so far as to withdraw the pin *o* from before the arm *b*, whereupon the latter is immediately set in rotation by the weight and sweeps the animal off the platform into the box; the trap-door then flies up again as the spring *k* extends, and the next arm, *b*, catches and is held against the pin *o*, thus resetting the trap and closing the box.

A sheet-metal partition, *r*, incloses the block *n* and spring *k*, so as to prevent the animal from injuring the same.

Having thus described my invention,

What I claim as new, and desire to secure by Letters Patent, is—

The arrangement of the box A, platform *h*, trap-door *i*, spring *k*, bait-block *n*, shaft *a*, and radial arms *b*, when said shaft and arms are made to revolve in any suitable manner, substantially as described.

T. E. MARABLE.

Witnesses:
 CHAS. A. PETTIT,
 THOS. D. D. OURAND.